(12) United States Patent
Maeding et al.

(10) Patent No.: US 11,645,092 B1
(45) Date of Patent: May 9, 2023

(54) BUILDING AND DEPLOYING AN APPLICATION

(71) Applicant: International Business Machines Corporation, Armonk, NY (US)

(72) Inventors: Nicolas Maeding, Holzgerlingen (DE); Dirk Herrendoerfer, Sindelfingen (DE); Peter Morjan, Boeblingen (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 17/509,169

(22) Filed: Oct. 25, 2021

(51) Int. Cl.
*G06F 9/445* (2018.01)
*G06F 9/455* (2018.01)
(Continued)

(52) U.S. Cl.
CPC ............ *G06F 9/44505* (2013.01); *G06F 8/61* (2013.01); *G06F 9/4401* (2013.01);
(Continued)

(58) Field of Classification Search
CPC ...... G06F 9/44505; G06F 8/61; G06F 9/4401; G06F 9/45558; G06F 21/33; G06F 21/602; G06F 2009/45587
See application file for complete search history.

(56) References Cited

U.S. PATENT DOCUMENTS

| 10,031,993 | B1 | 7/2018 | Poornachandran |
| 11,537,283 | B2 * | 12/2022 | Gonzalez ............. G06F 40/197 |

(Continued)

FOREIGN PATENT DOCUMENTS

| CN | 103440436 A | 12/2013 |
| CN | 106605233 A | 4/2017 |

(Continued)

OTHER PUBLICATIONS

"Patent Cooperation Treaty PCT Notification of Transmittal of the International Search Report and the Written Opinion of the International Searching Authority, or the Declaration", International application No. PCT/IB2022/059697, International filing date Oct. 10, 2022, Priority dated Oct. 25, 2021, 8 pages.

(Continued)

*Primary Examiner* — Phillip H Nguyen
(74) *Attorney, Agent, or Firm* — Wiliam H. Hartwell; Jared L. Montanaro

(57) ABSTRACT

The present disclosure relates to a method for deploying an application in an execution environment using a first and second sets of key pairs. The method comprises: creating a sequence of tasks comprising build tasks followed by a deploy task. The tasks are configured to receive a task input for performing the tasks. The task input comprises a contribution input and an output of a task preceding at least one of the build tasks. The contribution input comprises secrets. The output of the build tasks is encrypted with a respective encryption key of the first set of key pairs, wherein the contribution input of a task subsequent to the first task is encrypted with a respective encryption key of the second set of keys. The tasks may be executed in the execution environment using unencrypted content of the task inputs.

20 Claims, 4 Drawing Sheets

(51) Int. Cl.
  *G06F 9/4401* (2018.01)
  *G06F 21/33* (2013.01)
  *G06F 8/61* (2018.01)
  *G06F 21/60* (2013.01)

(52) U.S. Cl.
  CPC .......... *G06F 9/45558* (2013.01); *G06F 21/33* (2013.01); *G06F 21/602* (2013.01); *G06F 2009/45587* (2013.01)

(56) References Cited

U.S. PATENT DOCUMENTS

| | | | |
|---|---|---|---|
| 2003/0084056 A1* | 5/2003 | DeAnna | G06F 16/27 |
| 2013/0232463 A1* | 9/2013 | Nagaraja | G06F 8/70 |
| | | | 717/101 |
| 2014/0007222 A1* | 1/2014 | Qureshi | H04L 67/10 |
| | | | 726/16 |
| 2015/0096011 A1* | 4/2015 | Watt | G06F 3/0647 |
| | | | 726/15 |
| 2016/0234625 A1* | 8/2016 | Wang | H04L 67/06 |
| 2017/0168777 A1* | 6/2017 | Britt | G06F 8/20 |
| 2017/0230179 A1 | 8/2017 | Mannan | |
| 2017/0351868 A1* | 12/2017 | Jacob | G06F 9/45541 |
| 2018/0329693 A1* | 11/2018 | Eksten | G06F 8/65 |
| 2020/0210585 A1 | 7/2020 | Thom | |
| 2020/0252207 A1 | 8/2020 | Hanel | |
| 2020/0394120 A1* | 12/2020 | Fathi Salmi | G06F 8/36 |
| 2021/0006402 A1 | 1/2021 | Ohms | |
| 2021/0042148 A1 | 2/2021 | Alford | |
| 2021/0117242 A1 | 4/2021 | Van De Groenendaal | |

FOREIGN PATENT DOCUMENTS

| | | |
|---|---|---|
| CN | 110519260 A | 11/2019 |
| WO | 2020231952 A1 | 11/2020 |

OTHER PUBLICATIONS

IBM, "List of IBM Patents or Patent Applications Treated as Related", Appendix P, 2 pages, dated Oct. 26, 2021.

Nunez Mencias et al., "Trusted Workload Execution", U.S. Appl. No. 17/509,164, filed Oct. 25, 2021, 31 pages.

Authors et. al.: Disclosed Anonymously, "Fully Decentralized Cloud Using Generalized Trusted Execution Environments and Distributed Hash Tables (Without Blockchain)", An IP.com Prior Art Database Technical Disclosure, IP.com No. IPCOM000264923D, IP.com Electronic Publication Date: Feb. 5, 2021, 7 pages.

Mell et al., "The NIST Definition of Cloud Computing", Recommendations of the National Institute of Standards and Technology, Special Publication 800-145, Sep. 2011, 7 pages.

* cited by examiner

BUILDING AND DEPLOYING AN APPLICATION

BACKGROUND

The present invention relates to the field of digital computer systems, and more specifically, to building and deploying an application.

In cloud environments, physical resources may be shared by virtual machines owned by different cloud consumers. For that, hypervisors used in the cloud may offer rich interfaces that are exposed to cloud customers; however, vulnerabilities in their security models may lead to unauthorized access to these shared resources and customer information. Attackers may be able to manipulate assets belonging to the cloud and provoke denial of service, data leakage, data compromise, and direct financial damage for users/customers of such cloud infrastructure.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method comprising: creating a sequence of tasks comprising one or more build tasks and one or more deploy tasks, wherein: the one or more build tasks are configured to build at least part of an application using secrets, and the one or more deploy tasks are configured to deploy the built application, the one or more build tasks and the one or more deploy tasks are configured to receive a task input for performing the task, the task input comprising a contribution input received from a data source system associated with said task and an output of a task preceding said task, the contribution input comprising secrets of the application, the output of the one or more build tasks is encrypted with a respective encryption key of the second set of key pairs; and executing in an execution environment the sequence of tasks using unencrypted content of the task input of the tasks.

In another aspect, the invention relates to a computer program product comprising a computer-readable storage medium having computer-readable program code embodied therewith, the computer-readable program code configured to implement the steps of the method according to preceding embodiments.

In another aspect, the invention relates to a computer system comprising one or more computer processors, one or more computer-readable storage media, and program instructions stored on the computer-readable storage media for execution by at least one of the one or more processors, the program instructions comprising instructions to implement the steps of the method according to the preceding embodiments.

DETAILED DESCRIPTION

Figure 1:
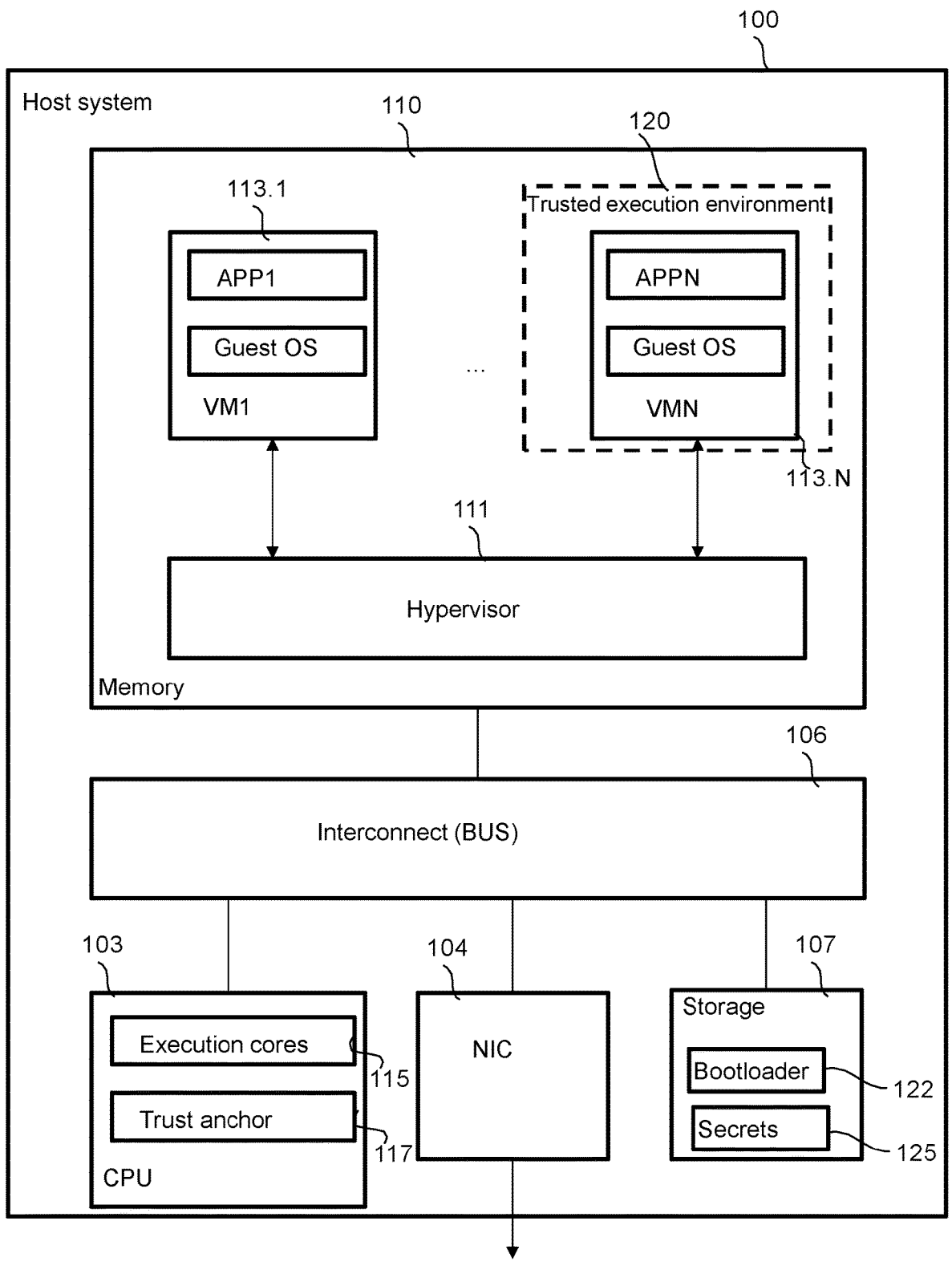
FIG. 1 is a block diagram of a computer system in accordance with an example of the present subject matter.

The building and deployment of an application may involve a collection of systems that contribute to provide a set of processing services to implement the building and deployment of the application. Each system of the collection of systems may typically be a separate, independent computing system interconnected with each of the other systems via a communications medium, e.g., a network. The collection of systems may comprise data source systems that contribute to the building and deployment of the application and a deployment system (also referred to herein as host computer system) where the built application is to be deployed and executed. Each system of the collection of systems may be a single computer system or a distributed computer system. The host computer system may implement multiple execution environments using hardware, software, or a combination of both for managing, processing, and/or storage of assets. An execution environment may be a collection of hardware and/or software components that defines a computing configuration. Each execution environment has certain resources available to the particular execution environment for storage and execution of assets. The trusted execution environment (TEE) may be an example of an execution environment.

Depending on the type and/or number of the systems contributing to the building and deployment of the application, the definition and implementation of the set of tasks may be technically challenging, especially if security becomes an issue. The present subject matter may define the set of tasks so that there is an isolation between previous, current and next tasks in the set of tasks. The set of tasks may be a sequence of tasks that may be executed in a particular order. Each task of the set of tasks may be associated with a data source system in order to receive input from the data source system. The task may comprise a set of computer executable instructions. The sequence of tasks comprises build tasks followed by a deploy task. Building the application is performed by executing the sequence of build tasks. The execution of the sequence of build tasks may result in a file e.g., image (named final file), that includes elements needed to run the application such as application code, operating system, bootloader, system libraries and settings. Each build task of the build tasks is configured to build at least part of the application meaning that the build task provides at least part of the elements of the final file. The build task may create code and/or load code and/or package and/or compile/create packages using the input of the build task. For example, a very small code may exist at the beginning and may be extended in every build task to provide the final file. The deploy task (DT) may be configured to use the final file of the building tasks to deploy the application in an execution environment of the host computer system.

The sequence of build tasks (BT) may comprise a sequence of N build tasks $BT_1, \ldots BT_N$ where $N \geq 2$, where $BT_1$ is the first build task and $BT_N$ is the last build task and a deploy task DT. That is, the set of tasks comprises N+1 tasks (T) where $T_1 = BT_1, \ldots T_N = BT_N$ and $T_{N+1} = DT$. Each task of the sequence of tasks $T_1, \ldots T_{N+1}$ is configured to receive a task input and process the task input. The task input may comprise build artifacts, configuration values etc. Each build task of the sequence of build tasks $BT_1$, $BT_N$ is configured to process the task input in order to provide a task output of the build task. The task output $OUT_{T_i}$ of each build task $BT_i$ (where i varies between 1 and N) may be one or more files e.g., image and/or other data artifacts. The task input of each task $T_i$ (where i varies between 1 and N+1) comprises a first (type) input $IN_{T_i}^1$. The first input $IN_{T_i}^1$ of each task $T_i$ may be provided by the data source system associated with or assigned to the task $T_i$. The first input $IN_{T_i}^1$ of each task $BT_i$ may be referred to as a contribution input as it provides a contribution of the data source system in the build process. The first input $IN_{T_i}^1$ of each task $T_i$ may comprise secrets. The task input of each task $T_i$ (where i varies between 2 and N+1) further comprises a second (type) input $IN_{T_i}^2$. The second input $IN_{T_i}^2$ of each task $T_i$ may be the output $OUT_{T_{i-1}}$ of the task $T_{i-1}$ immediately preceding the task $T_i$ (i.e., $IN_{T_i}^2 = OUT_{T_{i-1}}$). That is, the task input of the first build task $T_1 = BT_1$ may comprise only the first type input $IN_{T_1}^1$. "First input," "Second input" as used herein, are used for labelling or naming purpose, and do not imply any type of ordering (e.g., spatial, temporal, logical) of the inputs or limitation to two inputs, as more than one data source system may contribute to a given task $T_i$.

A secret refers to any type of data that the application does not want to make publicly available, such a program (e.g., build artifact, operating system), an encryption key, a user password, a password to access a remote computing device, and so forth. The secret may provide a method to include sensitive configuration information, such as passwords or SSH keys, to the process of the application. For example, the secrets may contain information in key-value pairs so that they can be mapped to environment variables. When mapped to environment variables, the NAME=VALUE relationships are set such that the name of the environment variable corresponds to the "key" of each entry in those maps, and the value of the environment variable is the "value" of that key.

The present subject matter may protect data involved in the building and deployment process by encryption of both the task inputs and the task outputs of the tasks. For that, two sets of key pairs are provided, the set of host key pairs and system key pairs. A key pair may be a combination of a public key that is used to encrypt data and a private key that is used to decrypt data. Using different sets of key pairs may enable an isolation between previous, current, and next task in the set of tasks and thus provide a secure building and deployment process. The set of host key pairs is owned by the host computer system so that the decryption keys of the set of host key pairs may only be accessible and used inside the processor of the given host computer system. The set of system key pairs may be owned by the data source systems. Each task output $OUT_{T_i}$ of each build task (where i varies between 1 and N) may be encrypted with a respective one or more distinct encryption (public) keys of the set of host key pairs. On the other hand, the first input of each task $T_i$ (where i varies between 1 and N+1 or i varies between 2 and N+1) may be encrypted with a respective one or more distinct encryption (public) key of the set of system key pairs. That is, the first input of the first build task $BT_1$ may or may not be encrypted. This is because the provision of the first input of the first build task $BT_1$ may be provided within the execution environment where the tasks are executed, where the environment may be a trusted execution environment.

Once created, the set of tasks may be executed in the execution environment of the host computer system following their order. The first build task $BT_1$ is first executed, followed by the execution of the second build task $BT_2$ and so on until execution of the build task $BT_N$ which is followed by the execution of the deploy task DT. This may result in the application being deployed in the execution environment of the host computer system. The application may thus be executed in the execution environment of the host computer system.

According to one embodiment, before executing each task $T_i$ (where i varies between 2 and N+1) of the tasks the second input $IN_{T_i}^2 = OUT_{T_{i-1}}$ may be decrypted meaning that the output $OUT_{T_{i-1}}$ received by the task $T_i$ may be decrypted using one or more decryption (private) keys of the set of host key pairs that are associated with the one or more encryption (public) keys of the set of host key pairs which are used to encrypt the received output $OUT_{T_{i-1}}$. The output $OUT_{T_{i-1}}$ comprises one or more decryption (private) keys for decrypting the received encrypted first input $IN_{T_i}^1$. Thus, by decrypting the second input $IN_{T_i}^2$ of each task $T_i$, the first input $IN_{T_i}^1$ may be decrypted. The decrypted first input and decrypted second input of each task may be used for executing the set of tasks $BT_1, \ldots BT_N$ and DT.

In another example, the decryption may be performed as part of the task. That is, executing each task $T_i$ (where i varies between 2 and N+1) of the tasks comprises: decrypting the second input $IN_{T_i}^2 = OUT_{T_{i-1}}$ meaning that the output $OUT_{T_{i-1}}$ received by the task $T_i$ may be decrypted using one or more decryption (private) keys of the set of host key pairs that are associated with the one or more encryption (public) keys of the set of host key pairs which are used to encrypt the received output $OUT_{T_{i-1}}$. The output $OUT_{T_{i-1}}$ comprises one or more decryption (private) keys for decrypting the received encrypted first input $IN_{T_i}^1$. Thus, after decrypting the second input $IN_{T_i}^2$ of each task $T_i$, the execution of each task comprises decrypting the first input $IN_{T_i}^1$.

According to one embodiment, the decryption of the first inputs $IN_{T_i}^1$ (where i varies between 2 and N+1) and second inputs $IN_{T_i}^2$ (where i varies between 2 and N+1) may be performed by a hardware component (e.g., a trusted anchor) of the processor of the host computer system.

Each task $T_i$ of the build tasks $BT_1, \ldots BT_N$ and the deploy task DT is associated with a respective data source system $ST_i$ (where i varies between 1 and N+1 and $T_1 = BT_1, \ldots T_N = BT_N$, $T_{N+1} = DT$). Each data source system $ST_i$ holds a pair of keys ($SK_i^{pub}$, $SK_i^{priv}$) of the set of system key pairs. The public key $SK_i^{pub}$ of a source system $ST_i$ associated with task $T_i$ may be used to encrypt the first input $IN_{T_{i+1}}^1$ of the subsequent task $T_{i+1}$ associated with the source system $ST_{i+1}$ and the private key $SK_i^{priv}$ may be provided as part of the output $OUT_{T_i}$ of the task $T_i$ associated with the source system $ST_i$. According to one embodiment, each task $T_i$ (where i varies between 1 and N+1) of the tasks is configured to receive at the run time from the respective data source system $ST_i$ the contribution input $IN_{T_i}^1$ for performing the task. According to one embodiment, the execution of each task of the tasks comprises querying the respective data source system to receive the contribution input. This may be advantageous as it may shorten the existence time of the contribution inputs compared to the case where the contribution inputs are provided by the data source systems before the execution of the tasks starts. This may further increase the secure aspect of the present subject matter.

In another example, each data source system $ST_i$ (where i varies between 1 and N+1) may provide the first input $IN_{T_i}^1$ of the respective task $T_i$ before the execution of the set of tasks starts. For example, each first input $IN_{T_i}^1$ may be provided by the data source system $ST_i$ to the host computer system via a connection e.g., network, between the data source system $ST_i$ and the host computer system.

According to one embodiment, each data source system $ST_i$ that provides the contribution input $IN_{T_i}^1$ to a task $T_i$ is configured for: receiving a digital certificate from each data source system $ST_j$ of the preceding tasks (where j varies between 1 and i−1); checking using the received digital certificate(s) whether the data source system(s) $ST_j$ of the preceding task(s) are valid, and if so using the public key(s) contained in the digital certificates to encrypt the first input $IN_{T_i}^1$ which may comprise secrets. The verification of the digital certificate may be performed against a certification authority (CA). In one example, each data source system $ST_i$ associated with each build task $T_i$ may request the digital certificate (that it provides to system $ST_{i+1}$) from a certificate authority (CA), wherein the request may comprise data indicative of the secrets of the build task $T_i$ (e.g., a hash of the secrets) that can be used by the CA to prove that data belongs to the respective source system $ST_i$.

According to one embodiment, each data source system $ST_i$ that provides the contribution input $IN_{T_i}^1$ to a task $T_i$ (where i varies between 2 and N+1) is configured for: receiving a digital certificate from the data source system $ST_{i+1}$ of the preceding task $T_{i-1}$;

checking using the received digital certificate whether the data source system $ST_{i-1}$ of the preceding task is valid, and if so using the public key contained in the digital certificate to encrypt the first input $IN^1_T$ which may comprise secrets. The verification of the digital certificate may be performed against a certification authority (CA).

The host computer system may, for example, be part of a cloud environment, which environment may be considered an untrusted environment. According to one embodiment, the execution environment comprises a trusted execution environment. The trusted execution environment may be implemented so that its execution and data space are isolated from other environments executing code on the host computer system. For example, the trusted execution environment may have dedicated or protected processing and system resources, such as secure storage and protected memory buffers. For example, the TEE may be embodied as a virtual machine managed using (IBM) Secure Execution for Linux or Secure Encrypted Virtualization (SEV) technology. A virtual machine (VM) may be a software implementation of a computer that executes computer programs as if it were a standalone physical machine. A user may initiate creation of the VM e.g., within the cloud environment for execution of the application. The user may request that the host computer system instantiates a new instance of a VM that may be completely empty without any executable code, in which case the executable code such as, for example, the final file of the build tasks may be supplied. As part of the deploy task, the VM may then start executing instructions specified in the bootloader that is contained in the final file. The bootloader may include instructions informing the VM of how the VM is to operate and may, for example, facilitate loading of a guest operating system. The guest operating system may be given the control by the bootloader so that the guest operating system may in turn load the application if it is not loaded by the bootloader into the memory of the VM and trigger execution of the application.

In another example, the execution environment may comprise multiple TEEs, wherein each TEE is associated with a respective task task $T_i$ (where i varies between 1 and N+1). Each task $T_i$ may be provided as an independent workflow that may be executed on the respective TEE. In this case, each output $OUT_{T_i}$ (where i varies between 1 and N) may comprise a distinct bootloader that can be used to execute the workflow of the task $T_{i+1}$ in the respective TEE. In this case, the execution of each task $T_i$ may comprise executing the respective bootloader in the respective TEE. The execution of each bootloader may comprise decryption of the first input $IN_{T_i}^1$ and second input $IN_{T_i}^2$ of the task $T_i$. The decryption keys of the set of host keys that are needed to decrypt the second input $IN_{T_i}^2$ of the task $T_i$ may be embodied with the bootloader of the task $T_i$. In this way, the end of the execution of the bootloader may result in the disappearance of the decryption keys.

The term "application" or computer application or workload in context of the invention can relate to any computer program or plurality of computer programs providing a particular functionality. For example, a computer application can be a web server application, a database server application providing database management services and databases, etc.

For example, a method for deploying in a build pipeline environment a workload with contributions from several entities, where each such entity introduces an entity secret into a build artifact, comprises the steps: protecting said build pipeline environment by a Trusted Execution Environment that is able to execute encrypted images, and that provides isolation between previous, current and next process steps in said build process, protecting said build artifacts by encryption, and protecting data used in said build process by encryption.

In one example, the set of tasks may comprise two build tasks and one deploy task. The first input $IN_{T_1}^1$, of the first build task may comprise a harden base operating system and a bootloader. The first input $IN_{T_1}^1$, may or may not be encrypted. The source system $ST_1$, associated with the first build task may provide a key pair ($SK_1^{pub}$, $SK_1^{priv}$) of the set of system key pairs. The public key $SK_1^{pub}$ may be provided to the data source system $ST_2$. As with the source system $ST_1$, the source system $ST_2$ may in turn provide a key pair ($SK_2^{pub}$, $SK_2^{priv}$) of the set of system key pairs. The public key $SK_2^{pub}$ may be provided to the data source system $ST_3$. The private key $SK_1^{priv}$ may be packaged by the first build task together with the first input $IN_{T_1}^1$, to create an image. The image may be encrypted with an encryption (public) key $HK_1^{pub}$ of the set of host key pairs. Thus, the output $OUT_{T_1}$ of the first build task may comprise the operating system, the bootloader, and the private key $SK_1^{priv}$. The source system $ST_2$ may encrypt the first input $IN_{T_2}^1$ of the second build task using the encryption key $SK_1^{pub}$ received from the source system $ST_1$. The first input $IN_{T_2}^1$ of the second build task may, for example, comprise a web user interface (UI) and customer relation management system. The first input $IN_{T_2}^1$ of the second build task may be received from the respective source system $ST_2$ and may further comprise the application itself and configuration values of the application. A hardware component of the processor of the host computer system may decrypt the received encrypted image $OUT_{T_1}$ using the decryption key $HK_1^{priv}$ of the set of host key pairs. The decryption key $SK_1^{priv}$ may be used to decrypt the first input $IN_{T_2}^1$. The execution of the second build task may, for example, package or integrate the application with the operating system, the bootloader, and the decryption key $SK_2^{priv}$ in an image and provides it as an output $OUT_{T_2}$. The image may be encrypted using another encryption key $HK^{pub}_2$ of the set of host key pairs. The source system $ST_3$ may encrypt the first input $IN_{T_3}^1$ of the deploy task using the encryption key $SK_2^{pub}$ received from the source system $ST_2$. The first input $IN_{T_3}^1$ of the deploy task may, for example, comprise a database password for accessing a database and/or a web TLS certificate. The first input $IN_{T_3}^1$ of the deploy task may be received from the source system $ST_3$ associated with the deploy task. The hardware component of the processor of the host computer system may decrypt the received encrypted image $OUT_{T_2}$ using the decryption key $HK_2^{priv}$ of the set of host key pairs. The decryption key $SK_2^{priv}$ may be used to decrypt the first input $IN_{T_3}^1$. The execution of the deploy task may comprise executing the bootloader to load the operating system and the application into a VM of the execution of the host computer system.

FIG. 1 is a block diagram of a computer system (also referred to herein as host system or host computer system) 100 in accordance with an example of the present subject matter.

The host system 100 may include hardware computing components connected by one or more interconnects 106. The host system 100 may include network interface cards (NICs) 104, a memory 110, CPU(s) 103, and a storage device 107 (e.g., a locally attached disk drive, solid-state device (SSD), or a connection to remote storage such as a SAN). For example, as shown, CPU 103 may include one or more execution cores 115. The host system 100 may be configured to execute applications APP1-APPN using virtual machines 113.1-113.N. The storage device 107 may comprise a bootloader 122 that may be used to configure and start at least part of the applications APP1-APPN. Part of or all of the applications such as the application APPN may, for example, require that some of their data is not publicly available by using secrets that protect such data. The protected data may, for example, comprise an encryption key, a user password, a password to access a remote computing device etc. These secrets of the application APPN may, for example, be received in encrypted format from a user of the application APPN. As shown in FIG. 1, the encrypted secrets 125 are stored in the storage 107. The secrets 125 may be encrypted with an asymmetric encryption technique where the user has used the public key to encrypt the secrets. The bootloader 122 may be embodied with the private keys. In one example, the bootloader 122 may be stored in encrypted format.

As shown in FIG. 1, the memory 110 may include a hypervisor 111 that is up and running. The hypervisor 111 may, for example, be implemented as a software layer that runs directly on the computing hardware of the host system 100 or may be implemented as part of a host OS of the host system 100. The hypervisor 111 may be configured to provide virtualized hardware elements for each virtual machine 113.1-N. The hypervisor 111 may instantiate any number of Virtual Machines (VMs). As shown in FIG. 1, the hypervisor 111 may instantiate VM instances 113.1-N. For each VM, the hypervisor 111 may allocate a chunk of memory and other resources e.g., each VM 113.1-N provides a virtualized computing platform with a virtual CPU, memory, storage, and networking interfaces. After being defined or created, the VMs 113.1-N may be initiated or booted using, for example, the bootloader 122. FIG. 1 shows, for example, the VMs 113.1-N after being booted. Each of the VMs 113.1-N comprises a guest operating system and the application that is to be executed on the VMs. Distinct VMs 113.1-N may, for example, be executed on different execution cores 115.

The host system 100 may be used to define a trusted execution environment 120 in accordance with the present subject matter. The trusted execution environment 120 may be implemented with one or more virtual machines to provide isolation from applications e.g., APP1 running in other execution environments. Assuming for simplification of the description that the trusted execution environment 120 is implemented by the VM 113.N. This may enable a secure execution of the application APPN in the trusted execution environment. The isolation may, for example, be enabled by a trust anchor 117 of the CPU 103. The trusted anchor 117 may, for example, protect read/write accesses by the VM 113.N of the trusted execution environment 120. The trusted anchor 117 may protect any data of information like state of the VM 113.N to be exposed outside of the CPU 103 or to any other VM or device like 104 or 106. This may, for example, prevent a VM executing on one execution core from accessing data belonging to another VM executing on a different execution core. The trust anchor 117 may provide the ability to decrypt the bootloader 122, in case it is provided in encrypted form, without exposing it unprotected by any means except during execution in 115.

Figure 2:
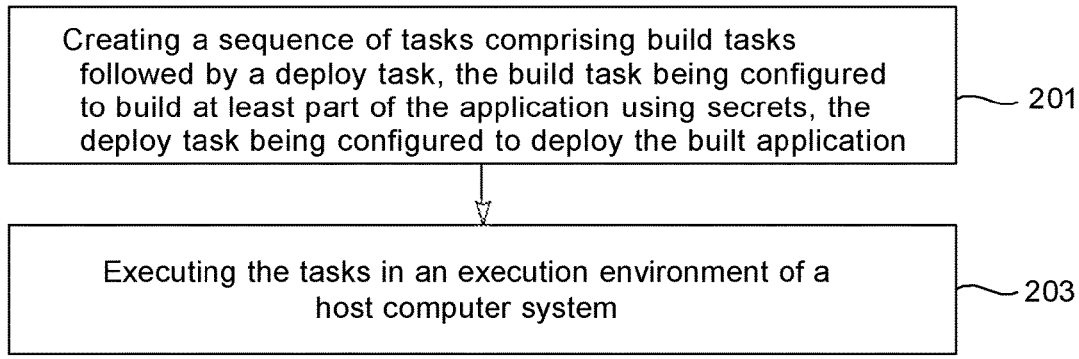
FIG. 2 is a flowchart of a method for executing an application in accordance with an example of the present subject matter.

FIG. 2 is a flowchart of a method for deploying an application in accordance with an example of the present subject matter. For the purpose of explanation, the method described in FIG. 2 may be implemented in the system illustrated in FIG. 1, but is not limited to this implementation.

A sequence of tasks $T_1, \ldots T_{N+1}$ may be created in step 201. The sequence of tasks comprises build tasks $T_1, \ldots T_N$ followed by a deploy task $T_{N+1}$. The build task is configured to build at least part of the application using secrets. The deploy task is configured to deploy the built application. Each task $T_i$ of the tasks is configured to receive a task input for performing the task $T_i$. The task input of each task $T_i$ comprises a contribution input received from the data source system associated with the each task $T_i$ and if it is preceded by a task (i.e., if i>1) the task input of task $T_i$ comprises an output of the task $T_{i-1}$ preceding the each task $T_i$. The contribution input comprises secrets of the application, wherein the output of each build task is encrypted with a respective encryption key of a set of host key pairs, wherein the contribution input of each task $T_i$ subsequent to the first task (i.e., i>1) is encrypted with a respective encryption key of a set of system key pairs. In one example, the contribution input of the first build task may be encrypted. The tasks may be executed in step 203 in the execution environment in accordance with the sequence using unencrypted content of the task input of the task i.e., the task $T_1$ is first executed, followed by $T_2$ and so on, and the task $T_{N+1}$ is the last executed task. For example, the tasks may be executed in the trusted execution environment 120.

Figure 3:
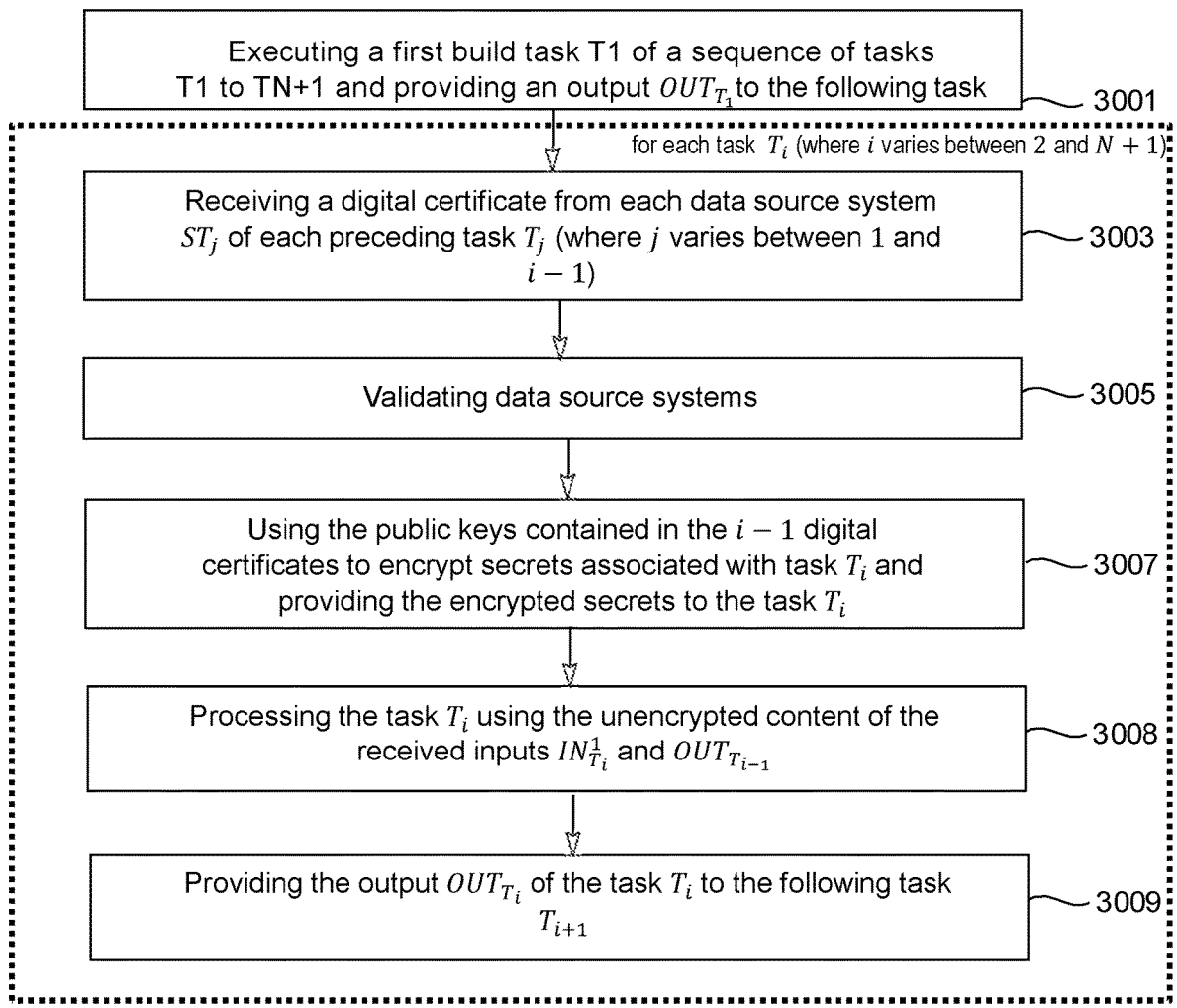
FIG. 3 is a flowchart of a method for executing an application in accordance with an example of the present subject matter.

FIG. 3 is a flowchart of a method for executing a sequence of tasks in accordance with an example of the present subject matter. For the purpose of explanation, the method described in FIG. 2 may be implemented in the system illustrated in FIG. 1. The sequence of tasks comprises build tasks $T_1, \ldots T_N$ followed by a deploy task $T_{N+1}$. Each task $T_i$ is associated with a source system $ST_i$. The execution of the build tasks may result in at least one file (named final file) that includes elements needed to run an application, where the elements may include, for example, application code, operating system, bootloader, system libraries and settings.

The first build task $T_1$ may be executed in step 3001. The first build task may receive a first input $IN_{T_1}^1$ e.g., from the source system $ST_1$. The first input $IN_{T_1}^1$ may comprise one or more elements of the final file. The first input $IN_{T_1}^1$ may or may not be encrypted. In one example, the first input $IN_{T_1}^1$ may be encrypted with an encryption public key or host key, wherein the associated private key is accessible by the hardware of the host computer system. The host computer system may decrypt the first input $IN_{T_1}^1$ so that the first build task may process the unencrypted content of the first input $IN_{T_1}^1$. The execution of the first build task may result in the output $OUT_{T_1}$ which is provided as input to the following task $T_2$. The output $OUT_{T_1}$ may, for example, be encrypted with a host key. Steps 3003 to 3009 may be performed for each task $T_i$ (where i varies between 2 and N+1).

The data source system $ST_i$ of the task $T_i$ may receive in step 3003 a digital certificate from each data source system $ST_j$ of each preceding task $T_j$ (where j varies between 1 and i-1).

The data source system $ST_i$ may check in step 3005 using each received digital certificates whether the respective data source systems are valid. This check may, for example, be performed using a certificate authority. If they are valid, the data source system $ST_i$ may use the public keys contained in the i-1 digital certificates to encrypt secrets associated with task $T_i$. The encrypted secrets may be provided in step 3007 as the first input $IN_{T_i}^1$ of the task $T_i$.

The task $T_i$ may be executed in step 3008 using the unencrypted content of the received inputs $IN_{T_i}^1$ and $OUT_{T_{i-1}}$. The unencrypted content may be obtained by decrypting the inputs $IN_{T_i}^1$ and $OUT_{T_{i-1}}$ of the task $T_i$. If the task $T_i$ is a build task, the result or output $OUT_{T_i}$ of execution of the task $T_i$ may be provided in step 3009 as input for the following task $T_{i+1}$. The output of the last build task $T_N$ may be the final file used by the deploy task to deploy the application. In one example, a digital certificate may be made available, as part of the output $OUT_{T_i}$, to enable later tasks $T_k$ (where k is>i) to validate the data source system $ST_i$ of the task $T_i$.

Figure 4:
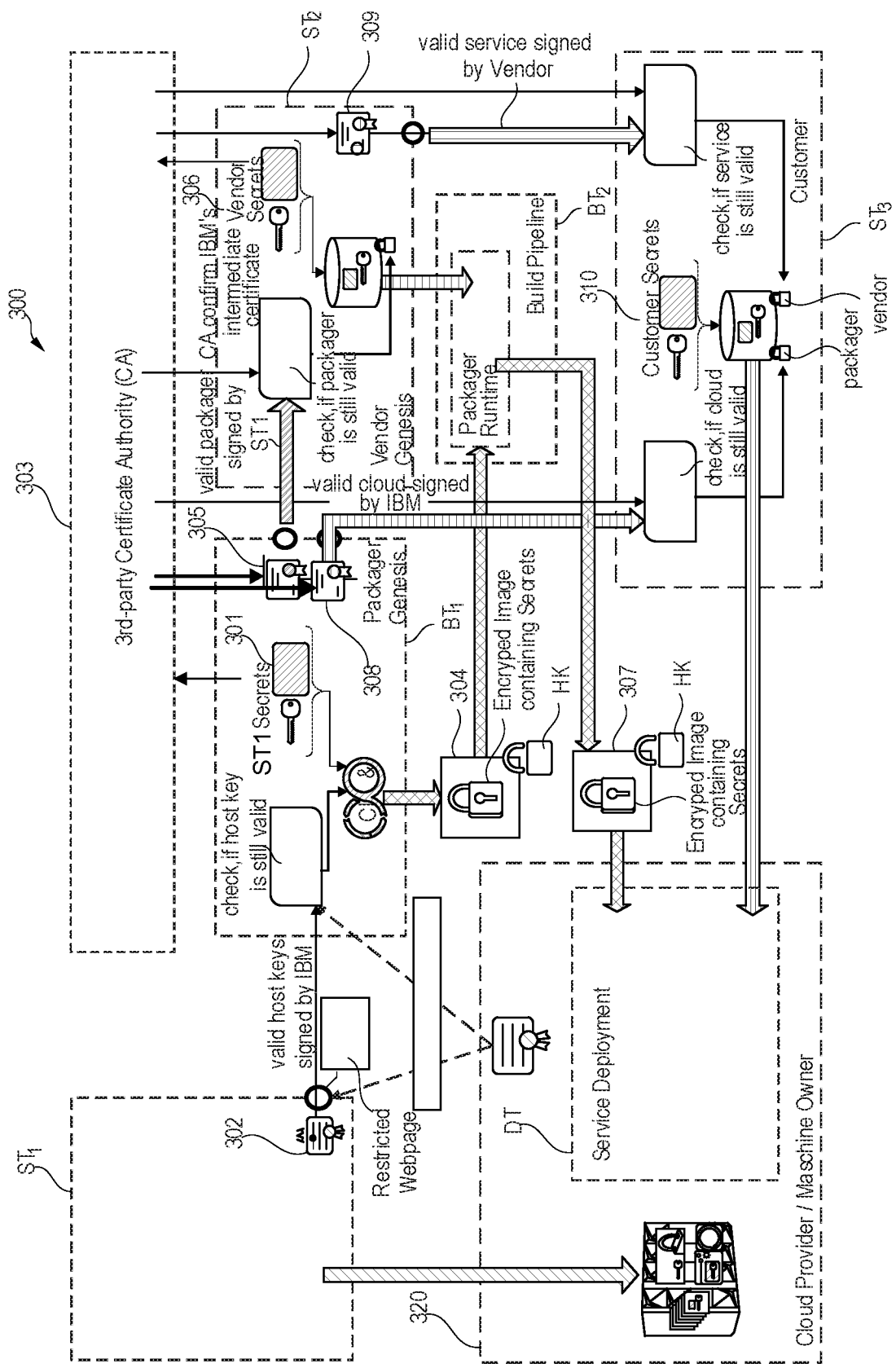
FIG. 4 is a diagram illustrating a method for executing a workload in accordance with an example of the present subject matter.

FIG. 4 is a diagram of a system 300 illustrating a method for building and deploying an application in accordance with an example of the present subject matter.

As illustrated in FIG. 3, the system 300 implements two build tasks $BT_1$ and $BT_2$ and one deploy task DT. The system 300 comprises source systems $ST_1$, $ST_2$ and $ST_3$ associated with the tasks $BT_1$, $BT_2$ and DT respectively. The source system $ST_1$ may provide two key pairs ($SK_1^{pub}$, $SK_1^{priv}$) and ($SK_2^{pub}$, $SK_2^{pub}$) so that they can be used by the source systems $ST_2$ and $ST_3$ respectively and the source system $ST_2$ may provide a key pair ($SK_3^{pub}$, $SK_3^{priv}$) so that it can be used by the source system $ST_3$. First secrets of contribution input 301 of the first build task may be used to request and obtain from a certificate authority (CA) 303 digital certificates 305 and 308 for the keys $SK_1^{pub}$ and $SK_2^{pub}$ respectively. Second secrets 306 of the second build task may be used to request and obtain from the CA 303 digital certificate 309 for the key $SK_3^{pub}$. The request of the digital certificate may, for example, be performed by sending a hash of the secrets, which is then used by the CA 303 to prove that it belongs to the respective source system. The first build task $BT_1$ may use a contribution input 301. The contribution input 301 comprises first secrets (e.g., secrets provided by the source system $ST_1$). The first build task $BT_1$ may check using a first digital certificate 302 whether a public host key is still valid. This check may be performed using the CA 303. If the public host key is still valid, the first build task may package the first secrets of the contribution input 301 with the private keys $SK_1^{priv}$ and $SK_2^{priv}$ in one image 304 and the image may be encrypted with the public host key. The encrypted image 304 is provided to the second build task $BT_2$.

The source system $ST_2$ may receive a second digital certificate 305 comprising the public key $SK_1^{pub}$ in order to check its validity. The check based on the digital certificate 305 may determine whether the public key $SK_1^{pub}$ is still valid. This check may be performed using the CA 303. If the public key $SK_1^{pub}$ is still valid, the source system $ST_2$ may encrypt the second secrets 306 using the public key $SK_1^{pub}$. The source system $ST_2$ may provide the encrypted second secrets 306 to the second build task $BT_2$. The encrypted image 304 may be decrypted by the hardware of the host computer system 320. The second build task $BT_2$ may use the decryption key $SK_1^{priv}$ that is inside the image 304 in order to decrypt the second secrets 306. The second built task may then package together the first secrets of the contribution input 301, the second secrets 306 and the private keys $SK_2^{priv}$ and $SK_3^{priv}$ in one image 307. The image 307 is then encrypted with another host key. The encrypted image 307 is provided to the deploy task DT.

The source system $ST_3$ may receive (e.g., from source system $ST_1$) a third digital certificate 308 comprising the public key $SK_2^{pub}$ in order to check its validity and a fourth digital certificate 309 (e.g., from source system $ST_2$) comprising the public key $SK_3^{pub}$ in order to check its validity. The checks based on the digital certificates 308 and 309 may determine whether the public key $SK_2^{pub}$ and $SK_3^{pub}$ are still valid. This check may be performed using the CA 303. If the public keys $SK_2^{pub}$ and $SK_3^{pub}$ are still valid, the source system $ST_3$ may encrypt the third secrets 310 using the public keys $SK_2^{pub}$ and $SK_3^{pub}$. The encrypted image 307 may be decrypted by the hardware of the host computer system 320. The deploy task DT may use the decryption keys $SK_2^{priv}$ and $SK_3^{priv}$ that are inside the image 307 in order to decrypt the third secrets 310. The deploy task may then deploy the application.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
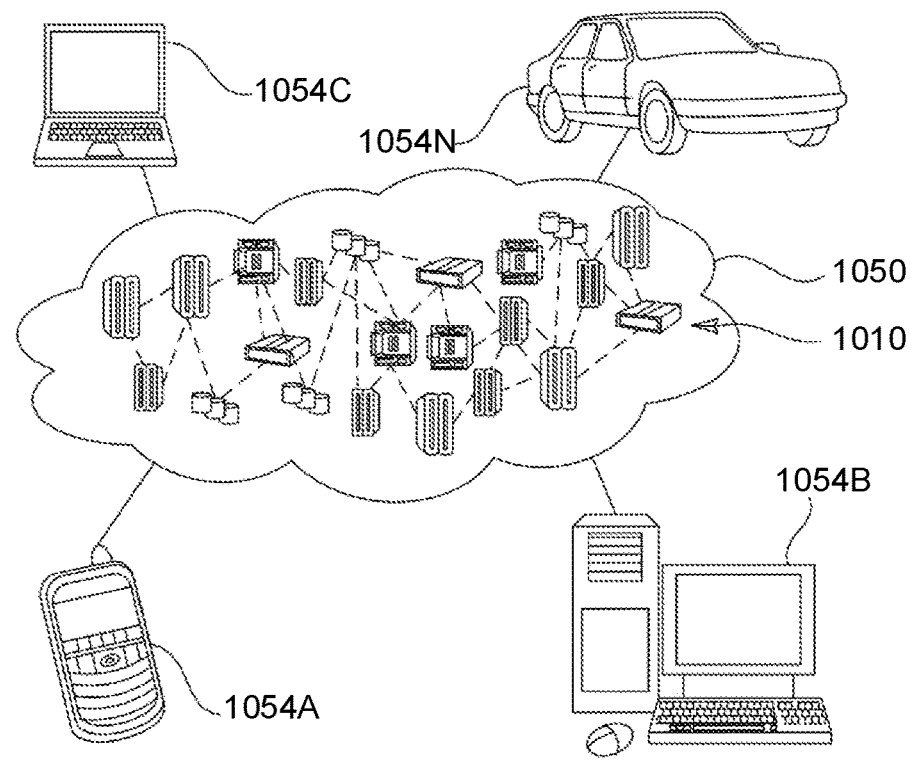
FIG. 5 depicts a cloud computing environment according to an embodiment of the present invention.

Referring now to FIG. 5, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

Figure 6:
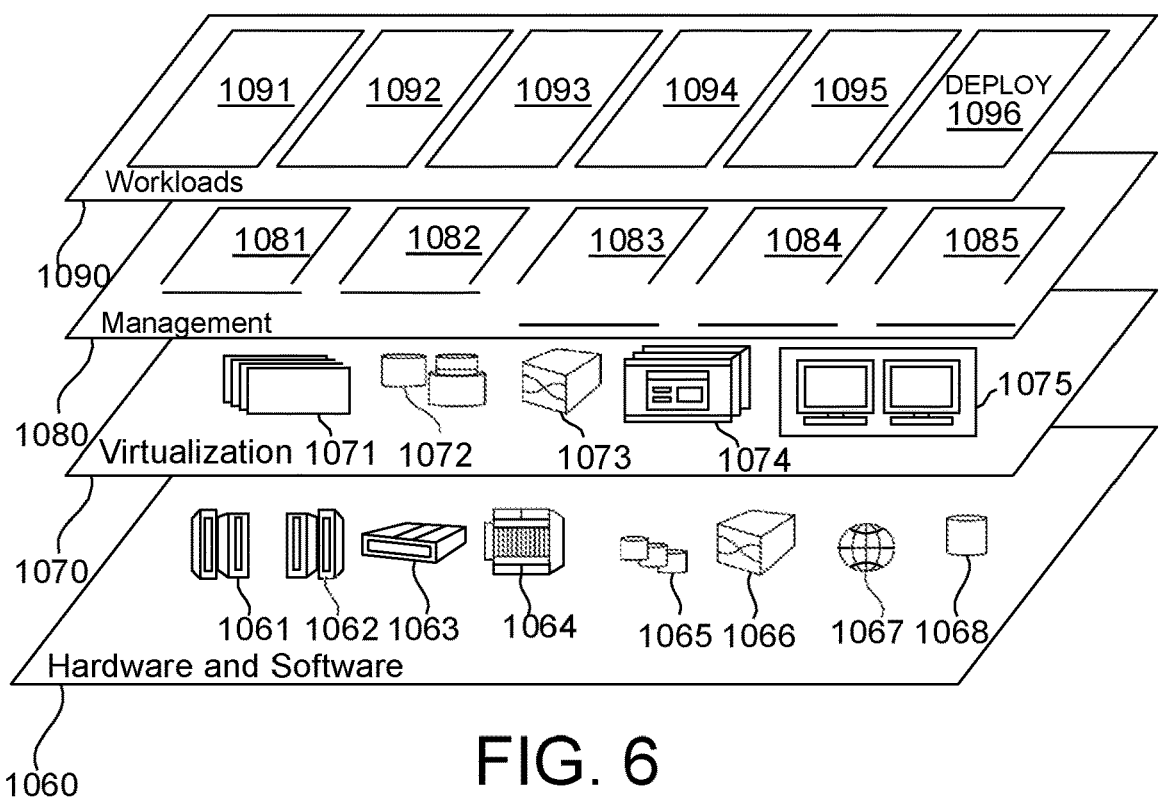
FIG. 6 depicts abstraction model layers according to an embodiment of the present invention.

Referring now to FIG. 6, a set of functional abstraction layers provided by cloud computing environment 1050 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA. In one example, the management layer 1080 may provide at least part of the present method e.g., the management layer 1080 may provide the method of FIG. 2 or 3.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and deployment of an application (DEPLOY) 1096 in accordance with the present subject matter e.g., as described with reference to FIG. 2, 3 or 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
creating a sequence of tasks comprising one or more build tasks and one or more deploy tasks, wherein:
the one or more build tasks are configured to build at least part of an application using secrets, and the one or more deploy tasks are configured to deploy the built application,
at least one task of the one or more build tasks and the one or more deploy tasks is configured to receive a task input for performing the task, the task input comprising a contribution input received from a data source system associated with said task and an output of a task preceding said task, and the contribution input comprising secrets of the application,
an output of the one or more build tasks is encrypted with a respective encryption key of a first set of key pairs, and
the contribution input is encrypted with a respective encryption key of a second set of key pairs; and
executing in an execution environment the sequence of tasks using unencrypted content of the task input.

2. The method of claim 1, wherein a host computer system is a holder of the first set of key pairs, wherein executing one or more tasks subsequent to a first task comprises:
decrypting the received output using a decryption key of the first set of key pairs, wherein the received output comprises a decryption key of the second set of key pairs; and
using the decryption key contained in the received output to decrypt the received contribution input, thereby obtaining the unencrypted content of the task input.

3. The method of claim 2, wherein decrypting the output is performed by a process of the execution environment that has exclusive access to the decryption keys of the first set of key pairs.

4. The method of claim 2, wherein for the one or more tasks subsequent to a first task, a data source system associated with one or more tasks preceding said one or more subsequent tasks is an owner of the key pairs that is used to encrypt the contribution input of said task.

5. The method of claim 4, wherein the data source system associated with said one or more subsequent tasks is configured to receive the encryption key for encrypting the contribution input from the data source system associated with the one or more preceding tasks.

6. The method of claim 1, wherein at least one task of the one or more build tasks and the one or more deploy tasks is configured to receive, at a run time, the contribution input for performing the one or more tasks from a respective data source system.

7. The method of claim 1, wherein the execution of the one or more build tasks and the one or more deploy tasks comprises querying the data source system to receive the contribution input.

8. The method of claim 1, wherein the execution environment comprises at least one trusted execution environment.

9. The method of claim 8, wherein the trusted execution environment comprises one or more virtual machines of a host computer system, wherein the host computer system is configured to protect memory data of the one or more virtual machines.

10. The method of claim 8, wherein the execution environment comprises multiple trusted execution environments associated with the one or more build tasks and the one or more deploy tasks respectively, wherein the execution of the one or more build tasks and the one or more deploy tasks is performed in the respective trusted execution environment.

11. The method of claim 10, wherein the execution of the one or more build tasks and the one or more deploy tasks comprises: invoking a bootloader and executing the bootloader thereby executing the task, wherein for task subsequent to the first task, the execution of the bootloader comprises decrypting the output received by the task using the decryption keys for obtaining the unencrypted content, thereby deleting the decryption keys, wherein the decryptions keys are embodied with the bootloader.

12. The method of claim 1, wherein the output comprises an encrypted image.

13. The method of claim 1, wherein executing the sequence of tasks comprises decrypting encrypted data using the decryption keys for obtaining the unencrypted content.

14. The method of claim 1, wherein at least one data source system that provides the contribution input to a task is configured, for at least one preceding task, to:
receive a digital certificate from the data source system the preceding task;
check using the received digital certificate whether the data source system of the preceding task is valid; and
responsive to determining that the data source system is valid, use the public key(s) contained in the digital certificates to encrypt the secrets.

15. A computer program product comprising:
one or more computer readable storage media and program instructions stored on the one or more computer readable storage media, the program instructions comprising instructions to:
create a sequence of tasks comprising one or more build tasks and one or more deploy tasks, wherein:
the one or more build tasks are configured to build at least part of an application using secrets, and the one or more deploy tasks are configured to deploy the built application,
at least one task of the one or more build tasks and the one or more deploy tasks is configured to receive a task input for performing the task, the task input comprising a contribution input received from a data source system associated with said task and an output of a task preceding said task, and the contribution input comprising secrets of the application,
an output of the one or more build tasks is encrypted with a respective encryption key of a first set of key pairs, and
the contribution input is encrypted with a respective encryption key of a second set of key pairs; and
execute in an execution environment the sequence of tasks using unencrypted content of the task input.

16. The computer program product of claim 15, wherein the computer-readable program code is provided as a service in a cloud environment.

17. The computer program product of claim 15, wherein the output comprises an encrypted image.

18. A computer system comprising:

one or more computer processors;

one or more computer-readable storage media;

program instructions stored on the computer-readable storage media for execution by at least one of the one or more processors, the program instructions comprising instructions to:

create a sequence of tasks comprising one or more build tasks and one or more deploy tasks, wherein:

the one or more build tasks are configured to build at least part of an application using secrets, and the one or more deploy tasks are configured to deploy the built application, at least one task of the one or more build tasks and the one or more deploy tasks is configured to receive a task input for performing the task, the task input comprising a contribution input received from a data source system associated with said task and an output of a task preceding said task, and the contribution input comprising secrets of the application, an output of the one or more build tasks is encrypted with a respective encryption key of a first set of key pairs, and the contribution input is encrypted with a respective encryption key of a second set of key pairs; and execute in an execution environment the sequence of tasks using unencrypted content of the task input.

19. The computer system of claim 18, wherein the output comprises an encrypted image.

20. The computer system of claim 18, wherein the execution environment comprises at least one trusted execution environment.

* * * * *